Dec. 15, 1970     L. WISSEL     3,546,749
MOLD, ESPECIALLY VULCANIZING
MOLD, FOR VEHICLE TIRES
Filed July 8, 1968

INVENTOR
LOUIS WISSEL

United States Patent Office 3,546,749
Patented Dec. 15, 1970

3,546,749
MOLD, ESPECIALLY VULCANIZING MOLD, FOR VEHICLE TIRES
Louis Wissel, Egestorf, Deister, Germany, assignor to Continental Gummi-Werke Aktiengesellschaft, Hannover, Germany
Filed July 8, 1968, Ser. No. 743,064
Claims priority, application Germany, July 6, 1967, C 42,803
Int. Cl. B29c 1/00; B29h 17/00
U.S. Cl. 18—44               7 Claims

ABSTRACT OF THE DISCLOSURE

A mold for vulcanizing a vehicle tire having a tread surface with depressions and with web-shaped dogs in said depressions connected to one side wall thereof for engagement with the opposite side wall of the respective depression, said mold including an annular body with inwardly extending web-shaped protrusions having undercut recess means corresponding to the shape of the dogs to be formed, and plate means anchored in said annular body and forming part of said web-shaped protrusions while simultaneously forming a wall of said recess means.

---

The present invention relates to a mold, especially vulcanizing mold for pneumatic vehicle tires, and in particular concerns a mold adapted to be used to cast or injection mold pneumatic vehicles with a profiled tread surface for molding supporting cams in the depression of the profile of the tread surface. The invention is in particular directed to molds of the above-mentioned type in which web-like protrusions of the mold for molding depressions in the tread profile have undercut recesses for the supporting cams.

The above-mentioned supporting cams which are employed primarily with so-called rib tires, i.e. with vehicle tires having circumferential ribs, are intended to increase the stability or rigidity of adjacent profile elements, especially when transverse or inclined forces act upon the tire. When the profile elements are subjected to a certain load which acts in a direction transverse to the longitudinal direction thereof and which are relatively high, the supporting cams of the profile elements will engage the respective adjacent profile elements. Furthermore, the said supporting cams between the profile elements have to be so designed and arranged that they will not interfere with the flowing-off of liquid through the depressions between the profile elements when the tire moves over a wet road.

With the heretofore known molds, which consist of a material adapted to be cast or injection molded, the web-shaped protrusions for molding the depressions of the profile consist exclusively of the above-mentioned castable or injection moldable material. However, already for reasons inherent to the casting technique, it is not possible so to design the mold that with the tire molded thereby (in non-molded condition of the tread strip) the distance between the supporting cams and the respective adjacent profile element will be so short that already when relatively low forces become effective, the respective supporting cam will engage the respective adjacent profile element. If the walls defining this distance, which with heretofore known molds have a wall thickness of approximately 1.2 millimeters, were reduced as to their wall thickness, there would exist the danger of being destroyed, and an unsatisfactory molding during the manufacture of the mold would inhere, with the result that there also exists the danger that the pneumatic tire will be formed in a faulty manner.

It is, therefore, an object of the present invention to provide a mold, especially vulcanizing mold, for molding supporting cams in the depressions of the tire profile, which will overcome the above-mentioned drawbacks.

It is another object of this invention to provide a mold as set forth in the preceding paragraph, which will assure that with sufficient strength of the web-shaped protrusions forming the profile depressions and the supporting cams extending thereinto there will be produced supporting cams arranged at a relatively short spacing from each other.

These and other objects and advantages of the invention will appear more clearly from the following specification in connection wiht the accompanying drawing, in which.

The mold according to the present invention is characterized primarily in that the walls arranged in the plane of the protrusions and defining the recesses are formed by plates or sheet metal portions anchored in the castable or injection moldable material of the mold. Preferably, austenitic corrosion resistant steel or stainless steel is employed for the plates or sheet metal parts. In view of these plates or sheet metal members inserted in the web-shaped protrusions, it will now be possible for said protrusions to select a wall thickness of approximately 0.3 to 0.5 millimeter, thereby obtaining the desired corresponding small ditsance between the supporting cams.

In order to assure a sufficiently strong anchoring of the plates or sheet metal parts in the protrusions of the mold, said sheet metal parts or plates may have the marginal portions of their foot sections profiled. Preferably, their lateral marginal areas may be provided with notches which after completed casting of the vulcanizing mold, bring about a positive connection. For purposes of increasing the strength of the webs and of the anchoring of the plates or sheet metal parts, these plates or sheet metal parts are preferably so dimensioned that they protrude beyond undercut recesses in the mold on all sides.

Figure 1:
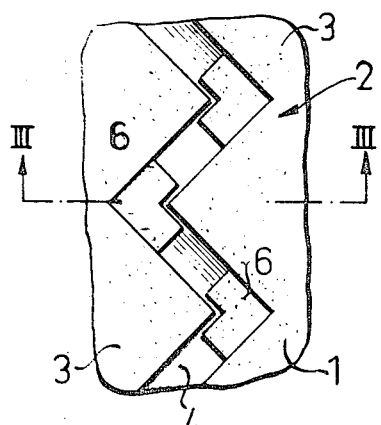
FIG. 1 illustrates a view of a portion of a tread strip surface of a vehicle tire according to the invention.
Figure 2:
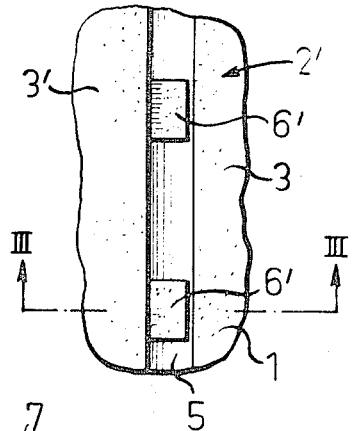
FIG. 2 is a view of a portion of a vehicle tire slightly modified over that of FIG. 1.

Referring now to the drawings in detail, the pneumatic tires to be produced have their tread strips 1 provided with circumferential ribs 3 which determine or characterize the tread surface 2, 2'. These circumferential ribs 3 are separated from each other by zigzag-shaped depressions or grooves 4. While these depressions 4, according to FIG. 1, are of a zigzag shape, they may also extend along a straight line in circumferential direction, as indicated by the reference numeral 5 in FIG. 2.

Figure 3:
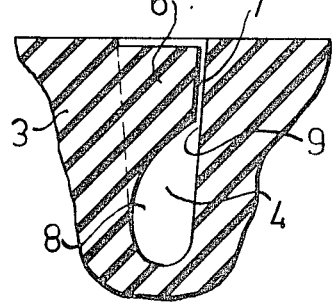
FIG. 3 represents a section taken along the line III—III of FIG. 1, but may also be considered a section along the line III—III of FIG. 2.
Figure 4:
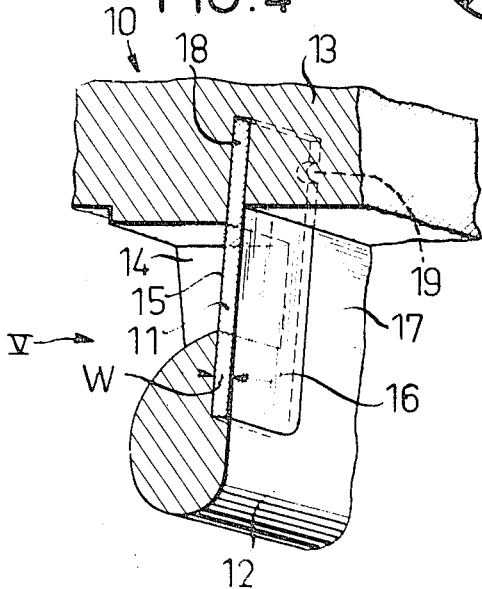
FIG. 4 is a section through a portion of a vulcanizing mold for molding the tread section portion of a tire.

One of the two circumferential ribs 3 comprises dogs or supporting cams 6, 6' which are radially spaced from the tread surface 2 and extend into the depressions or grooves 4, 5. The said supporting members or cams 6 are, according of FIG. 3, of a somewhat trapezoidal cross-section and have a substantially rectangular supporting surface 7. The supporting members 6, 6' do not extend to the bottom of the profile depressions 4, 5 but are located practically only in the upper portion of said depressions 4, 5 so that below said supports 6, 6' there remains a passage 8. When the tread strip 1 is in a non-deformed condition, the end face 7 is only slightly spaced from the adjacent side surface 9 of the depressions 4, 5. When certain forces act laterally upon the circumferential ribs 3, 3', the said slight distance between the surfaces 7 and 9 is overcome, so that the end face 7 abuts the side surface 9.

In order to reduce the maximum distance between the surfaces 7 and 9 to a minimum, plates 11 of corrosion-resistant steel are inserted into the vulcanizing mold 10, which latter is made of aluminum. The web-shaped protrusions 12 acting as core for molding the profile depressions 4, 5 form one single integral piece with the annular body 13 of the vulcanizing mold 10. These protrusions 12 are furthermore provided with window-shaped recesses 14 for molding the supporting members 6, 6'. These window-like recesses 14 are closed by the inserted plates 11 so that surface 15 of the plate 11 which is located in the window opening will mold the end face 7. The surface 16 of plate 11, which latter surface is located opposite to surface 15, is located in the side surface 17 of the protrusions 12 and thus steplessly merges with the surface 17.

Figure 5:
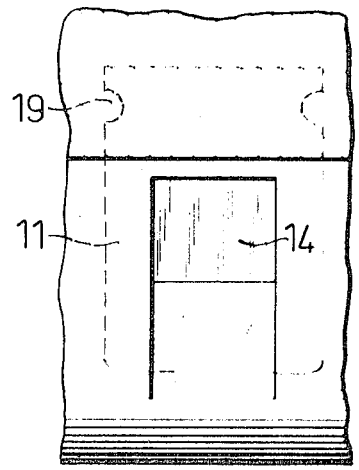
FIG. 5 is a section of the vulcanizing mold according to FIG. 4 as seen in the direction of the arrow V shown in FIG. 4.

The foot portion 18 of plate 11 is anchored in the annular body 13. For purposes of increasing the anchoring effect and obtaining a coherent form, the foot portion 18 is at both sides provided with recesses 19. As will be evident in particular from FIG. 5, the plates 11 are so dimensioned that they protrude beyond the window-like recesses 14 not only toward the top in the direction toward the annular body 13 but also in downward direction and to both sides. In this way, the anchoring effect is greatly increased and the strength of the plate 11 is improved, which strength is necessary in view of the pressure exerted when molding the tire. Merely by way of example, the wall thickness $w$ of the plate 11 may be approximately 0.5 millimeter.

It is a matter of course that the shape of the plates is adapted to the course of the profile depressions 4, 5. For the tire according to FIG. 2, plane plates 11 are employed, whereas for the tire according to FIG. 1, angle-shaped plates are used.

The annular body 13 with the protrusions 12 may form the entire vulcanizing mold. However, preferably, the annular body 13 is employed merely as an annular lining for an outer mold body of steel or the like.

It is, of course, to be understood, that the present invention is, by no means, limited to the specific showing in the drawings, but comprises numerous modifications, the scope of the invention being determined by the appended claims.

I claim:
1. For vulcanizing a vehicle tire having a tread surface with depressions around the tire and with web-shaped dogs in said depressions connected to one side wall thereof for engagement with the opposite side wall of the receiving depression in response to lateral forces acting upon the tire and exceeding a permissible magnitude, a mold which includes: an annular body comprising inwardly extending web-shaped protrusions having undercut recess means corresponding to the shape of the dogs to be formed, and plate means anchored in said annular body and forming part of said web-shaped protrusions while simultaneously forming a wall of said recess means to thereby with the finished tire determine the spacing of the respective dog in the tread surface depression from the respective nearest oppositely located wall portion of the respective depression.

2. A mold according to claim 1, in which said plate means protrude beyond all adjacent wall portions of the respective protrusion.

3. A mold according to claim 1, in which the thickness of said plate means is within the range of from 0.3 to 0.5 millimeters.

4. A mold according to claim 1, in which said plate means have an angle-shaped contour.

5. A mold according to claim 1, in which said plate means are made of corrosion resistant steel.

6. A mold according to claim 1, in which said annular body consists of aluminum.

7. A mold according to claim 1, in which said annular body is surrounded by a body of steel.

References Cited
UNITED STATES PATENTS

| | | | |
|---|---|---|---|
| 2,732,589 | 1/1956 | Steadman | 18—44X |
| 2,736,924 | 3/1956 | Bean | 18—44 |
| 2,836,855 | 6/1958 | Hawkinson | 18—44 |
| 2,840,857 | 7/1958 | Lett | 18—44 |
| 2,848,744 | 8/1958 | Crooker | 18—44 |
| 3,328,849 | 7/1967 | Kung et al. | 18—44 |
| 3,432,888 | 3/1969 | Brierley | 18—44 |

J. HOWARD FLINT, Jr., Primary Examiner

U.S. Cl. X.R.
18—47